United States Patent

Holt et al.

[19]

[11] Patent Number: 6,132,010
[45] Date of Patent: Oct. 17, 2000

[54] ACCUMULATOR PRESSURE CONTROL IN VEHICLE BRAKE SYSTEMS

[75] Inventors: Michael John Holt, Kenilworth; Barry John Bridgens, Quarry Bank, both of United Kingdom

[73] Assignee: Lucas Industries Public Limited Company, Solihull, United Kingdom

[21] Appl. No.: 08/983,510

[22] PCT Filed: Jul. 18, 1996

[86] PCT No.: PCT/GB96/01731

§ 371 Date: Apr. 17, 1998

§ 102(e) Date: Apr. 17, 1998

[87] PCT Pub. No.: WO97/05001

PCT Pub. Date: Feb. 13, 1997

[30] Foreign Application Priority Data

Jul. 28, 1995 [GB] United Kingdom .................... 9515542

[51] Int. Cl.[7] .................................................. B60T 13/14
[52] U.S. Cl. .......................................... 303/11; 303/122.12
[58] Field of Search .......................... 303/10, 11, 116.4, 303/122.12, 122.13, 122.14

[56] References Cited

U.S. PATENT DOCUMENTS

| 5,197,787 | 3/1993 | Matsuda et al. ........................ 303/11 |
| 5,295,737 | 3/1994 | Epple et al. .............................. 303/11 |
| 5,487,593 | 1/1996 | Potts et al. ................................ 303/11 |
| 5,733,017 | 3/1998 | Nakashima et al. ...................... 303/11 |
| 5,779,327 | 7/1998 | Nakashima et al. ............... 303/122.12 |
| 5,791,745 | 8/1998 | Sakakibara ................................ 303/11 |

*Primary Examiner*—Matthew C. Graham
*Attorney, Agent, or Firm*—Oblon, Spivak, McClelland, Maier & Neustadt, P.C.

[57] ABSTRACT

A vehicle braking system in which a stored volume of working fluid is used by a brake control system to apply the brakes under the control of an electronic control unit. The stored volume is replenished by pumping additional working fluid using a pump driven by an electric motor. The electric motor is periodically energized. An inferred value is established for the accumulator pressure based on an assessment of the motor response during the periods of energization. The electric motor can be arranged to be energized for short periods at predetermined intervals and the motor response during these periods assessed. From this assessment, either the switch-on point for driving the pump motor for the purpose of recharging the stored volume of working fluid is determined from the level of motor torque applied during the short periods of energization, or, where the system includes a pressure sensor for detecting the working fluid pressure, a signal for corroborating the signal of the pressure sensor is established from the level of motor torque applied during the short periods of energization.

17 Claims, 10 Drawing Sheets

ACCUMULATOR PRESSURE CONTROL IN VEHICLE BRAKE SYSTEMS

BACKGROUND OF THE INVENTION

1. Field of the Invention

The present invention relates to vehicle braking systems and is concerned in particular with an apparatus and method for assessing and controlling the pressure level within an accumulator from a pumped supply in such braking systems.

The present apparatus and method can be applied, inter alia, not only to pneumatic braking systems where a compressor charges air tanks of the braking system but also, as in the examples described hereinafter, to systems wherein a fluid pump is arranged to charge a high-pressure fluid accumulator. In both of these cases, the stored volume of working fluid is used by a brake control system to apply the brakes of the vehicle, under the control of an electronic control unit.

The brake control system is required to ensure that a volume of working fluid is available for operating the brakes and which remains within a prescribed pressure window, ie. between upper and lower thresholds of pressure. When the system is operated, the stored volume within the accumulator is depleted and needs to be replenished by pumping additional fluid from a reservoir (or from atmosphere in the pneumatic case) using a suitable pump, driven by an electric motor.

2. Discussion of the Background

Conventionally, the pressure within the accumulator is monitored and measured by means of a pressure transducer or pressure switch. When the pressure within the accumulator drops below a prescribed minimum level, the electronic control unit switches on the electric motor driving the fluid pump and leaves this motor running until the accumulator pressure has risen to a prescribed upper or maximum pressure level. However, the use of such pressure transducers or pressure switches adds significantly to the cost of such braking systems, particularly where the window or pressure range over which the pressure is being controlled is small, since the cost of suitable transducers or switches with appropriate accuracy is high.

It is also known, for example from GB-A-2225874, that a measure of the prevailing accumulator pressure can be gained by monitoring the power/current absorption of the electric motor driving the pump whilst it is running. As the pumped pressure increases, so the torque that must be applied by the motor to the pump shaft also increases. This can be established by measuring the motor current so that an inferred pressure level can be obtained. However, with such systems, a pressure transducer or other switching device is still required in order to determine the switch-on pressure level for the motor since, according to such systems, the pressure level can only be monitored during actual running of the motor.

SUMMARY OF THE INVENTION

It is one objective of the present invention to enable the latter pressure transducer to be eliminated also.

It would also be useful to be able to provide a means by which the signal provided by a pressure sensor can be checked and corroborated where a pressure sensor is the primary sensing device, and it is a second object of the present invention to establish such a means.

In accordance with the present invention, there is provided a vehicle braking system of the type in which a stored volume of a working fluid is used by a brake control system to apply the brakes of the vehicle under the control of an electronic control unit, the stored volume being held in an accumulator and being arranged to be replenished by pumping additional working fluid using a pump driven by an electric motor, the system being characterised by means whereby the electric motor driving the pump is periodically energised and by means which establish an inferred value for the accumulator pressure based on an assessment of the motor response during the periods of energisation.

In some embodiments, the electric motor driving the pump is energised for short periods at predetermined intervals, the inferred accumulator pressure being assessed from the motor response during these periods.

In the case where the system does not include a pressure sensor as such for the purpose, the switch-on point for driving the pump motor for the purpose of recharging the stored volume of working fluid can be arranged to be assessed from the level of motor torque applied during said short periods of energisation.

Alternatively, in the case where the system does include a pressure sensor device which detects the pressure of the working pressure fluid, a signal for corroborating the signal of the pressure sensor can be established from the level of motor torque applied during said short periods of energisation.

In the latter case, a controller can monitor motor speed performance, and from previously observed characteristics infer the pressure over time. This inferred pressure can be used to confirm the transducer reading, or signal erroneous transducer behaviour and then revert to the alternative control scheme described herein. This method can also provide information on gradual deterioration of the motor/pump/accumulator sub-system.

Preferably, said motor response is assessed by checking for rotation of the motor for a given applied motor torque.

Preferably, the torque on the electrical pump motor is arranged to be ramped up to a calculated value which represents a minimum pressure threshold, then held for a short period before being switch off, the resulting motor response being monitored.

Advantageously, said calculated value of torque is derived from the product of said minimum pressure threshold (P), the effective area (A) of the pump piston and the throw radius Rthrow of the pump cam.

One preferred method of ramping the pump motor torque up to the calculated value involves control of the motor current in that the current to the motor is increased at a set or prescribed rate up to a value which is calculated to produce the calculated torque (assuming a directly proportional relationship between the motor current and the torque). Another, more preferred method of ramping up the pump motor torque uses PWM control of the motor wherein the mark-period ratio of the PWM input signal is ramped up from zero to a predetermined value, less than one (assuming that the mean motor torque=PWM ratio×motor continuous torque (see FIG. 8 attached hereto). We refer herein to the mark-period ratio rather than to the more usual mark-space ratio because if the mark+space is considered to be equal to one "period", than the preferred method involves controlling the "mark-toperiod" ratio, where the mark can be varied as a percentage of the total "period".

BRIEF DESCRIPTION OF THE DRAWINGS

The invention is described further hereinafter, by way of example only, with reference to the accompanying drawings, wherein.

DISCUSSION OF THE PREFERRED EMBODIMENTS

Figure 1:
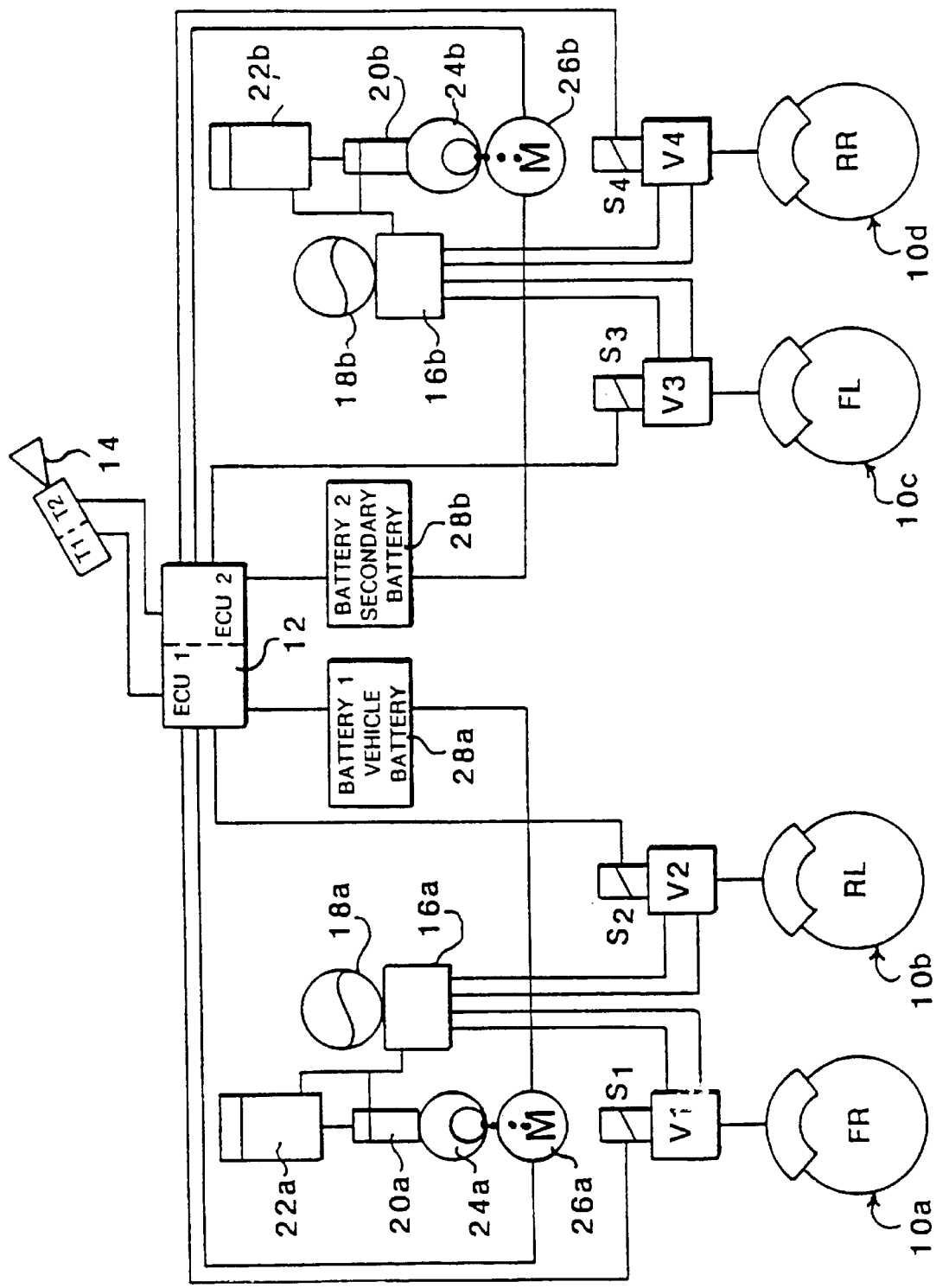
FIG. 1 is a diagrammatic view of one embodiment of a vehicle braking system to which the present invention is applied.

Referring first to FIG. 1, the illustrated braking system comprises a plurality of wheel brakes 10a, 10b, 10c, 10d bearing the designations FR (front right), RL (rear left), FL (front left) and RR (rear right). These brakes are driven by way of respective proportional pressure control valves V1, V2, V3 and V4 controlled by solenoids $S_1$, $S_2$, $S_3$ and $S_4$ energised by primary (ECU1) and secondary (ECU2) sections of an electronic control unit 12. The electronic control unit 12 receives driver demand input signals corresponding to driver braking demand from transducers T1, T2 responsive to displacement of a driver controlled input pedal 14.

In this example, the front brake FR and rear brake RL are supplied with actuating fluid from a hydraulic unit 16a coupled to a first accumulator 18a and the front brake FL and rear brake RR are supplied with actuating fluid from a hydraulic unit 16a coupled to a second accumulator 18b. The accumulators 18a, 18b are themselves coupled to respective pumps 20a, 20b and reservoirs 22a, 22b, the pumps being driven by electric motors 26a, 26a via respective eccentric rotors 24a, 24b. The motors 26a, 26a are driven in this instance by separate batteries 28a, 28b via the respective parts ECU1 and ECU2 of the electronic control unit 12, the latter unit 12 having internal means (not shown in FIG. 1) for measuring the respective motor currents and/or voltage and assessing the corresponding motor torques therefrom.

Figure 2:
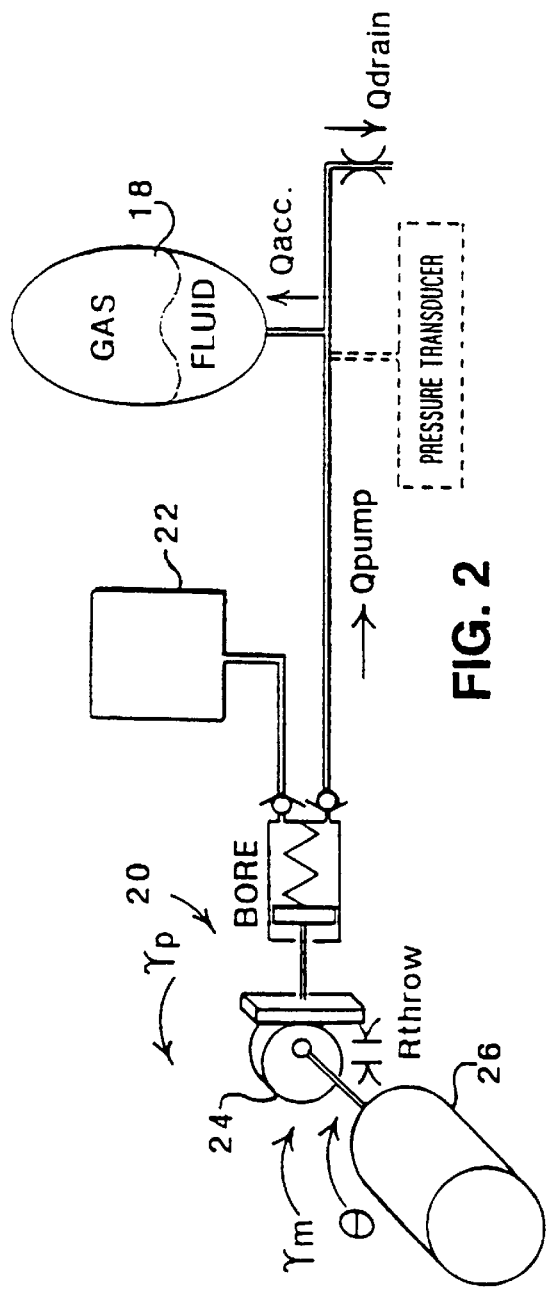
FIG. 2 is a detail view in diagrammatic format of a possible embodiment of part of the system of FIG. 1.

FIG. 2 illustrates diagrammatically the operating principle of one of the two accumulator/reservoir/ motor systems of FIG. 1 and the various parts have been numbered correspondingly.

For determining the switch-off point of the pump 20 supplying the accumulator 18, the pressure in the accumulator 18 is measured in this embodiment (as in the prior art) by determining the load on the electrically driven pump during a continuously running phase at full load. The pump is run in a closed loop speed control arrangement with, preferably, a pulse-width-modulated (PWM) drive, wherein the magnitude of the PWM signal required to maintain a target motor speed is proportional to the load on the pump and hence to the accumulator pressure. In this embodiment, the pump speed is measured without additional transducers, by measuring electronically the generated voltage of the motor during the PWM off phase.

As in the prior art, the aforegoing method provides a simple way of determining when the required maximum/ predetermined accumulator pressure has been reached and therefore when the pump is to be switched off. However, in embodiments where the intention is to avoid pressure sensors altogether, one still has to provide a solution to the problem of how the minimum pressure of the accumulator can be controlled since the accumulator pressure can only be determined when the pump is running.

In the presently described embodiment, this is achieved through assessment of the motor torque required to turn the motor from standstill against the prevailing reaction force.

For purposes of illustration of the principles of operation of the present embodiment, the system is described in terms of a simplified model for which a number of working assumptions can be made, as follows.

Figure 4:
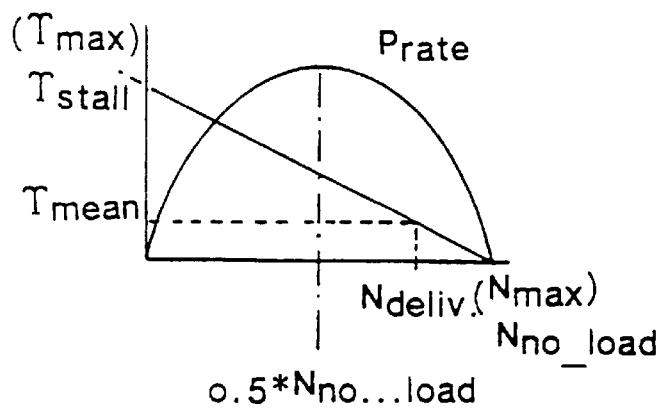
FIG. 4 illustrates a typical torque/load characteristic for the motor.

The motor is assumed to have a linear torque/ speed characteristic, falling from TauMax at zero speed to zero at MaxSpeed (=No load speed), as shown in FIG. 4. The motor can actually be specified by Rated (stall) torque and No load speed. The Rated Speed (speed for Rated Power) is for example, half the No load speed. Rated Power is calculated from these figures.

Figure 3A:
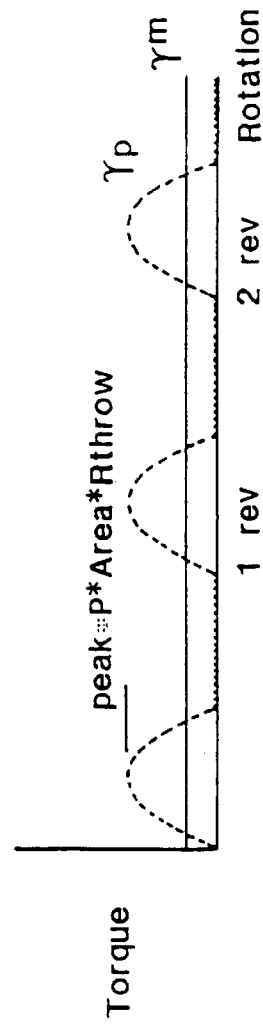
FIGS. 3a & 3b show operating characteristics of the model system of FIG. 2.
Figure 3B:
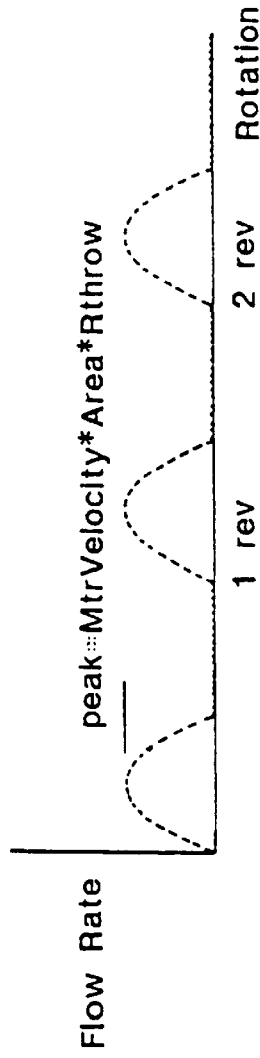

The pump is defined as shown in FIG. 2 as a single piston driven by an offset circular cam driving a flat follower (nb. the pump can equally well include multiple piston pumps). This gives a true sinusoidal motion of the piston. Compared to the gas in the accumulator, the fluid is assumed to be incompressible, and compared to the mechanical inertia the fluid is assumed massless. Perfect non-return valves are assumed at the inlet and outlet ports; hence the flow rate is given by piston area times the positive part of the velocity profile, as shown in FIG. 3b. The pump and fill strokes change over if the pump runs backwards, eg. when stopping.

The piston load due to the fluid pressure during the pumping stroke is given by the piston area times the pressure. It is assumed zero during the return, or infill, stroke. The return spring, if fitted, adds a force which varies with piston position. The torque on the drive shaft due to both fluid pressure and return spring is the above mentioned force times the lateral displacement of the circular cam centre. This is shown on the diagram in FIG. 3. To retain the same sign convention, the torque loading changes sign if the pump runs backwards.

The pump is specified by the cam radial throw, the piston bore, the spring pre-load (when the cam is at bottom dead centre, BDC) and spring rate, and the rotational inertia.

Similar principles apply for multi-piston pumps, where the transition between stalled and running will be easier to assess for pumps with three or more equi-spaced pistons.

The accumulator model represents a gas (eg. nitrogen) filled hydraulic accumulator, based on the ideal gas laws. It is specified by the gas volume in the empty (ie. no hydraulic fluid) condition (ie. the size of the accumulator) and the pre-charge gas pressure. As fluid is forced in to the accumulator the gas volume decreases, hence the gas pressure rises. The gas pressure is assumed to act on the fluid until the accumulator is fully discharged, when the pressure falls (instantaneously) to a low, or zero pressure.

Figure 5:
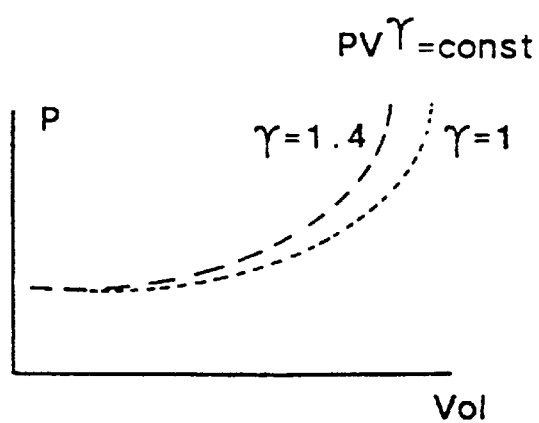
FIG. 5 shows typical pressure vs. volume characteristics for the accumulator.

The gas pressure-volume relationship is $PV^\tau$=constant where p is the pressure, v is the volume, and $\tau$ (gamma) is the ratio of specific heats for the gas. For isothermal compression $\tau$=1, and for adiabatic compression $\tau$=1.4 FIG. 5 shows the form of the pressure-volume relationships.

The volume of gas will be the volume when empty reduced by the volume of fluid introduced. Fluid flows in to the accumulator from the pump, and flows out to be used in the braking system, or to leak back to tank.

For the purposes of a brake system model, one can assume an incompressible, massless fluid which flows through non-compliant pipework between a pump and accumulator to a slave (calliper) cylinder and piston, and back to tank. The lumped compliances of O rings, pipework, pads and callipers are represented by a Pressure vs. Volume relationship for the calliper or brake actuator. The losses in the system include orifices in the flow lines from the accumulator and to the tank.

According to the controller model, the motor is arranged to be switched off when the speed has fallen below a threshold proportional to a certain upper pressure. Then, every few seconds, the motor torque is ramped up to the torque that would just overcome the lower pressure threshold. If the motor then runs, it is switched fully on. If it does not the process is repeated until it does.

A computation representing backlash is used to remove the motor speed fluctuations every revolution. It is assumed (initially) that the motor current can be controlled between zero and some maximum, hence motor torque can be controlled. It is also assumed that some measure of motor speed is available at infinite resolution and frequency.

A number of factors are used to modify the rated maximum torque from the motor.

The control factor (kc) is used to vary the torque with time over the starting test period. This can give a ramp rise in torque, or a step then a ramp rise, followed by a holding period. The height of the initial step is given as a fraction of the value at the end of the test period by the factor kstep. This is shown in diagrammatic form in FIG. 6.

A motor torque factor (km) is used to scale the torque down to some calculated value. The peak torque factor (kpeak) is the value assigned to km during a test run, calculated to just produce the pump peak torque at the set (low) pressure threshold. The product of kc and km (or kpeak) is the signal that is finally used to control current (hence torque) up to the maximum. An example in shown in FIG. 7 for a typical run. The first start test, marked A, shows the ramp and hold up to peak torque. At the end of the hold period, if pressure is still high the motor speed will be low, ie, not running, so the motor is switched off for the time T. off. At the end of the hold period on the next start test, marked B, the pressure has fallen below the set value, and the motor will be running. The motor is therefore run at maximum torque, and the speed checks for high pressure are invoked, marked C. When the speed has fallen to the given value, the motor is switched off until the next start test.

Figure 6:
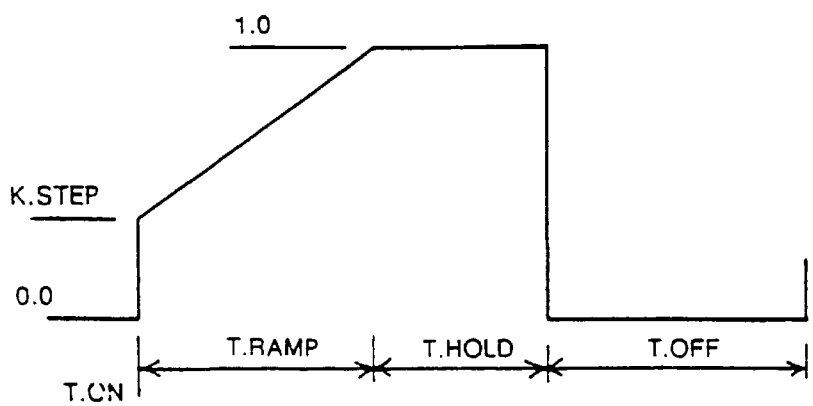
FIG. 6 illustrates a possible motor control method for starting.
Figure 7:
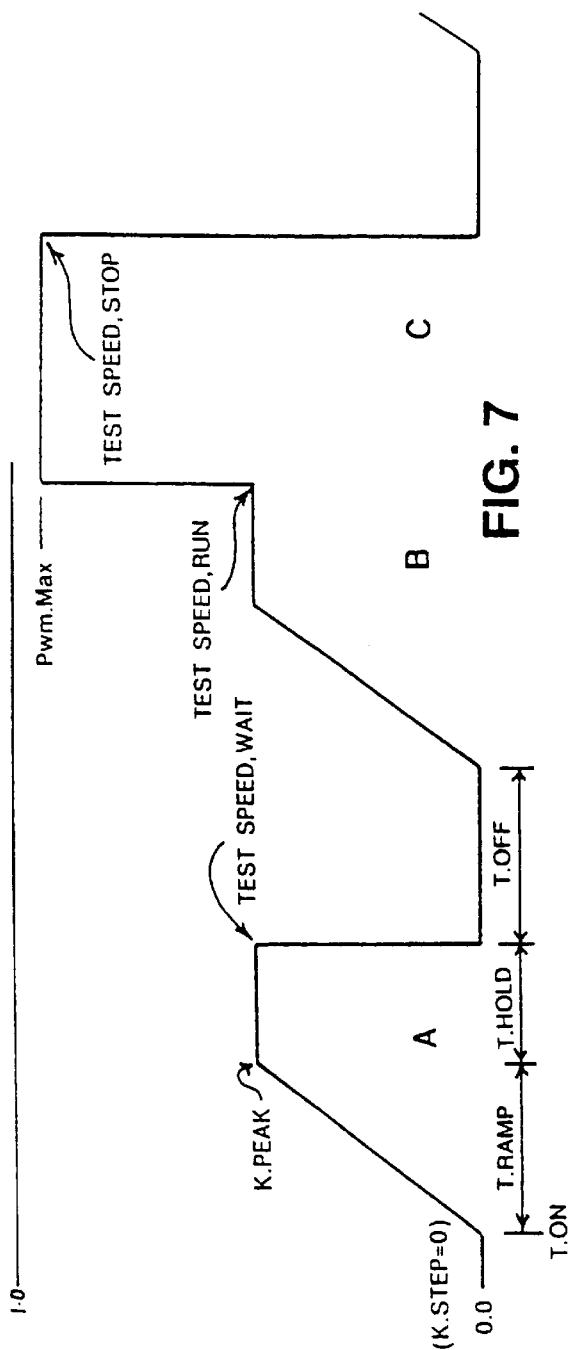
FIG. 7 illustrates a possible motor signal for starting and stopping.
Figure 8:
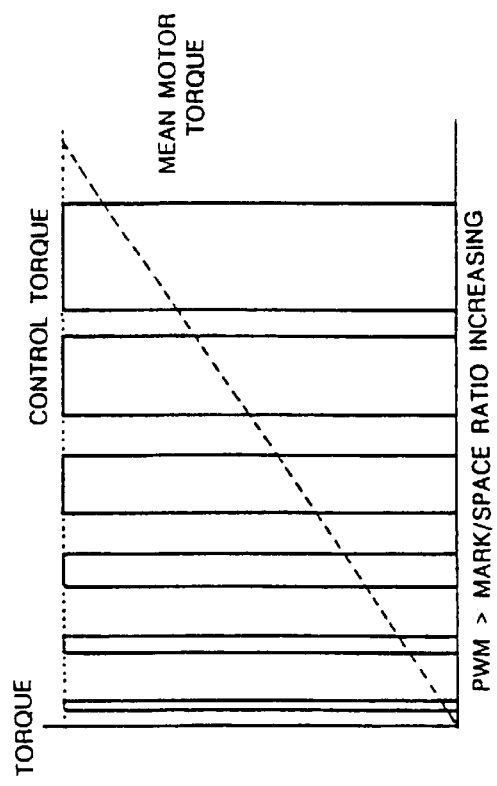
FIG. 8 shows how pump motor torque can vary with PWM mark/space ratio.

In FIGS. 6 and 7, Tramp would typically be in the region of 100 ms and Hold would typically be of the order of 20 ms.

In an alternative embodiment, the control factors are used to set the pulse width modulation factor for the motor current (motor-torque).

For establishing whether the motor is running or not, the technique of measuring generated back EMF can be used as described in our earlier WO 95/03963, to which reference is hereby directed.

When the technique is used to verify the signal from an installed pressure transducer, some slight changes are required. Rather than working to the single minimum pressure threshold, a search technique is required to find at what calculated torque value the pump runs. The calculated torque is directly related to pressure as already described, thus giving an independent method of inferring accumulator pressure. This method will take more time than simply deciding if the pump should run or not, but there are many long periods during normal vehicle usage when the pump would not be running, which can be used for these plausibility checks.

Reference is now made to a number of flow diagrams which illustrate possible means of implementing systems in accordance with the present invention. These illustrations show how, by sensing the motor condition, the system can not only provide an inferred pressure signal for use in the situation where no corresponding pressure sensor is provided but also for use to corroborate a pressure sensor signal where a pressure sensor is present as the primary sensing device. Furthermore, the flow diagrams show how, if desired, by a comparison of system signals, abnormalities in either the pressure sensor signal or motor condition can be detected.

Figure 9:
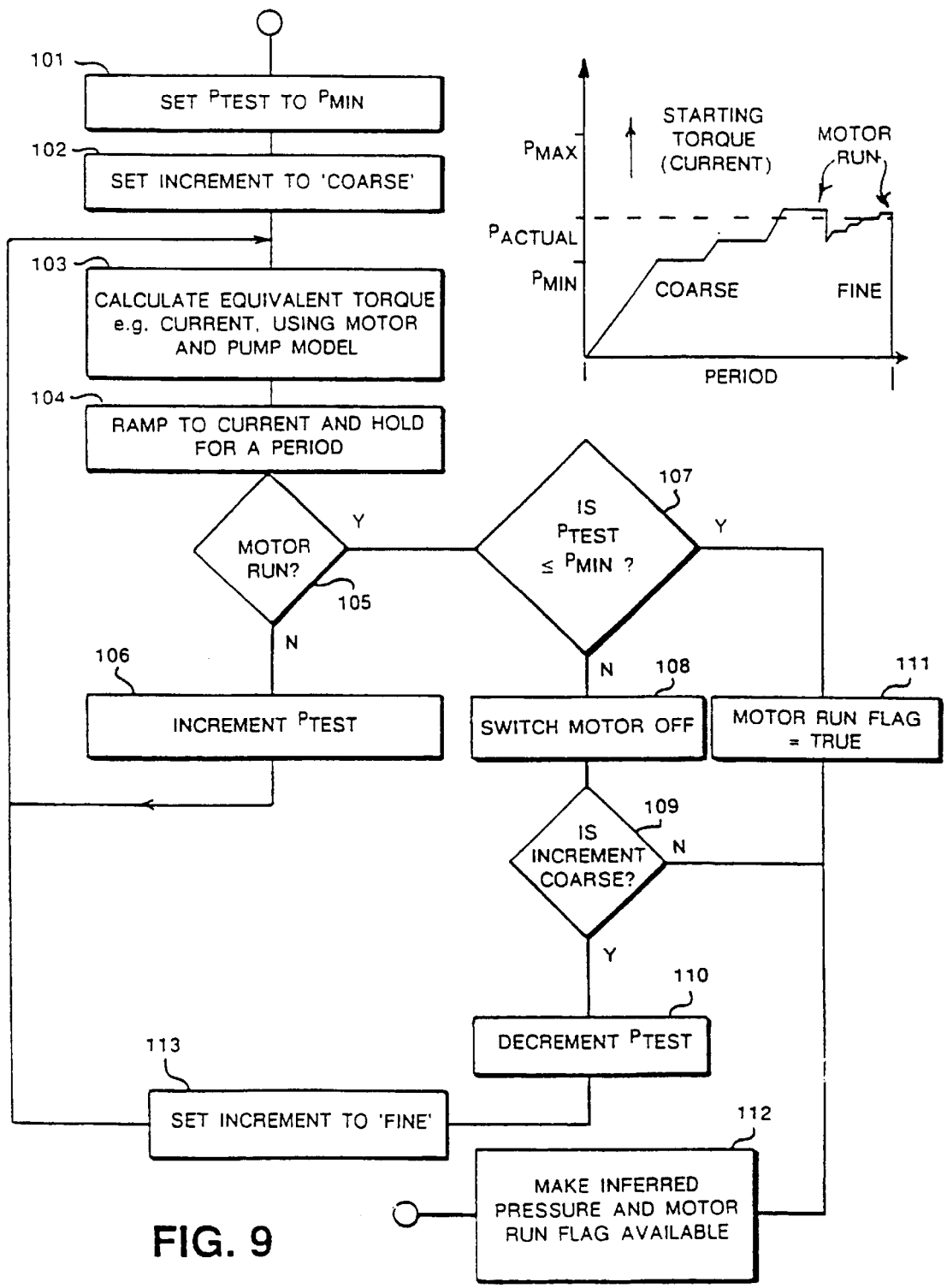
FIG. 9 is a flow diagram illustrating one mechanism by which periodic energisation of the motor can be used to provide an inferred motor torque value.

FIG. 9 shows how periodic energisation of the motor in the normally motor off state can be used to provide an inferred motor torque value which is proportional to the pressure being stored in the accumulator. The inferred pressure value can be used on its own for determining the appropriate switch-on point for the motor, or within a system employing a pressure sensor as the primary sensing element where corroboration of valid signals is required.

After the motor has run, causing the pump to fully charge the accumulator, the motor is switched off. At predetermined intervals, as pre-set within the controller, the routine as illustrated in FIG. 9 is entered. The object of the routine is to establish two things: firstly, the pressure actually being stored within the accumulator and secondly, whether this pressure is equal to or below the minimum pressure level threshold which is used to switch the motor back on.

The routine of FIG. 9 starts at point 101, where a $P_{test}$ value is set so as to be equivalent to the minimum pressure threshold $P_{min}$ at which motor start for pump operation is required. The increment by which the torque (current) will be increased for this evaluation is set to "coarse" (102), this allowing for rapid targeting of the approximate inferred pressure. Using the known motor and pump parameters, an equivalent current (torque) is calculated (103) that equates to the value of $P_{test}$. The motor is then energised in a controlled fashion where the current level is ramped up to the calculated target $P_{test}$ (140) and held for a short period. It is usually important to practice to ramp up the current in a controlled way so as not to "shock" the motor into accidentally running on, which would produce a lower than actual inferred accumulator pressure. The motor condition is then monitored (105). If the result of the motor run test is negative ie. the motor did not run at this current (torque) level during either the ramp up or hold time, then the $P_{test}$ value is incremented up one level and a new equivalent current (torque) is calculated (103). The ramp and hold test and motor run evaluation with increasingly larger calculated P test values are done until a positive result is achieved in the motor run test (105).

If the motor run test is positive and the $P_{test}$ value is equal to or less than the minimum pressure threshold $P_{min}$ (107), then it is assumed that the pressure within the accumulator is already at or below the switch-on threshold and a flag representing "motor run" is set to "true" (111), otherwise the motor is switched off (108), so as to prevent any pumping action, and the $P_{test}$ value is decremented by 1 "coarse" increment value. The magnitude of the increment values is now set to "fine" (113) and a new equivalent current (torque) value is calculated. The ramp and hold and motor run tests are carried out with "fine" increments until the motor runs (105). If the motor runs but the $P_{test}$ value is greater than $P_{min}$, then as long as the increment value is not "coarse" (109) the value of $P_{test}$ which now accurately represents the actual accumulator pressure is made available to the system (112).

The inferred pressure signal can be used by the system in several ways. First of all, it can be used in its "coarse" or "fine" form to switch the motor on to generate a pumping action so as to recharge the system accumulator. This happens via the motor run flag being set to "true" or, if during the fine increment test, $P_{test}$ is found to be equal or less than $P_{min}$ Secondly, the motor run flag and inferred pressure level $P_{test}$ information can be used to corroborate the pressure sensor signal that actually measures the pressure level within the accumulator circuit. This corroboration may be required to determine whether there is a fault within either the sensor or the accumulator circuit, or may be used where there is a significant lag in the pressure sensor signal, possibly caused by interposed valving and/or restrictions between the accumulator and the pressure sensor. Such restrictions, where there is a large demand on the accumulator resources i.e. during a long ABS stop, could cause the actual stored pressure to fall below the minimum acceptable level without the pressure sensor being instantly aware. In this case, the motor derived or inferred pressure level signal can be used to start the motor even though the pressure sensor signal is not demanding such a start. In this case, it can also be advisable to shorten the interval between motor energisations so that at larger accumulator discharge rates, or greater pressure decay rates, the interval between tests is substantially shortened, or made continuous and the inferred pressure level is used, in systems where a pressure sensor lag is known, to switch on the motor so as to start pumping action. This is shown schematically in FIG. 10.

Figure 10:
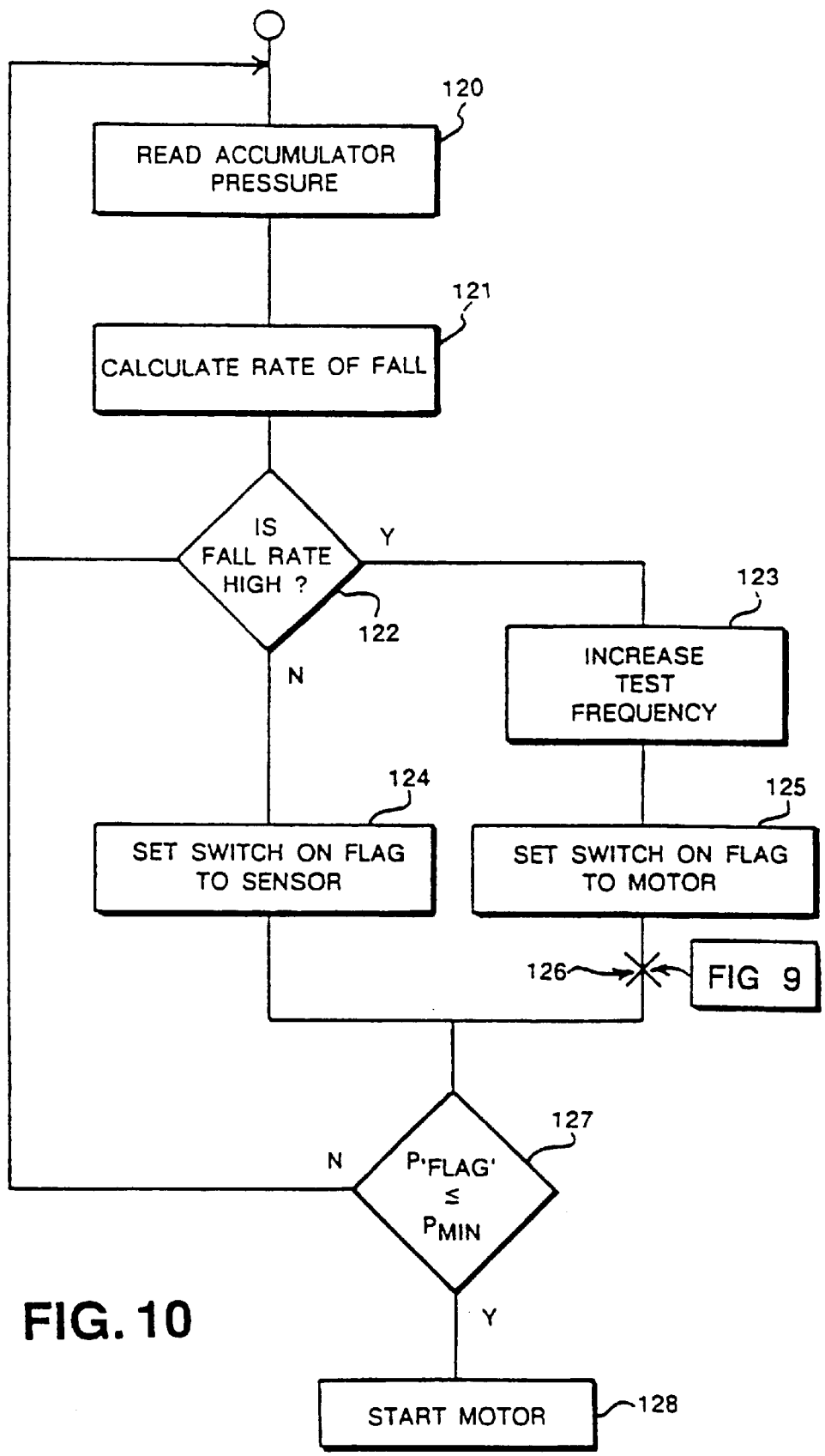
FIG. 10 is a flow diagram showing how the interval between tests can be varied.

Referring to FIG. 10, accumulator pressure is read at 120, the rate of pressure fall is calculated at 121, whether or not the fall rate is "high" is tested at 122, if the fall rate is high then the test frequency is increased at 123 and a switch on flag to the motor is set, if the fall rate is not high then a switch on flag to the pressure sensor is set, whether $P_{flag} \leq P_{min}$ is checked at 127 and if it is, the motor is started at 128, if it is not the routine returns to 120.

Figure 15:
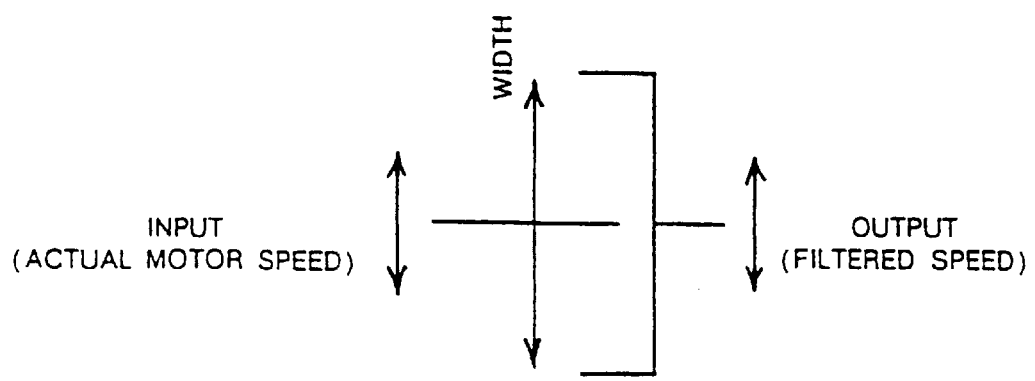
FIG. 15 pictorially illustrates the operation of a "backlash" mechanism.
Figure 14:
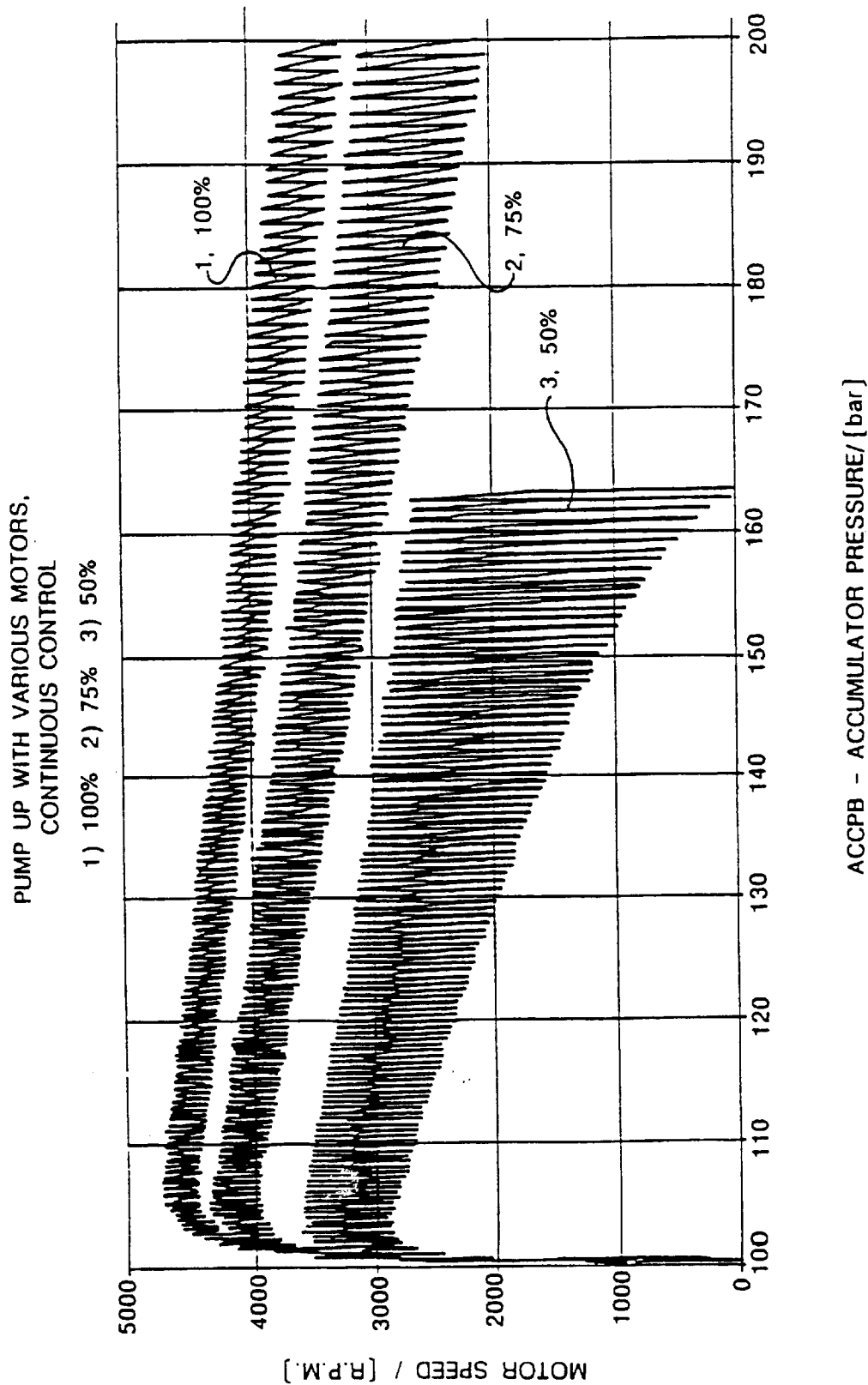
FIG. 14 is an example of a model of the motor and accumulator system showing how mean motor speed is proportional to stored pressure.

Once the motor is running, it is possible to assess the pressure being delivered to the accumulator by monitoring the motor speed and/or current. In a first example it is possible to monitor the motor speed whilst running the motor at a fixed torque or current. This is achieved by reference to a model/graph of the motor and accumulator system as shown in FIG. 14. This model/graph shows that mean motor speed is proportional to stored pressure and this is illustrated at three different fixed driving torques. A filter is applied to this motor speed signal so as to take out the disturbances in shaft speed due to the pumping action. A "backlash" filter such as illustrated in FIG. 15 can be used which produces a mean or averaged motor speed signal which with reference to the model can give a direct reading of stored pressure. This filter operates by assuming that the speed had to increase by a certain amount, eg. 175 rpm, before the filtered signal rose, and fall by double this before the filtered signal fell. The mechanism for this is depicted diagrammatically in FIG. 15. The motor speed calculation can be achieved in the same way as described in our earlier co-pending application "Motor Speed Control, published as WO95/03963" to which reference is hereby directed. The method used in the aforementioned case used a measure of the back e.m.f. generated during the off stage of a PWM cycle as an indication of motor running speed. With reference again to the model of present FIG. 14, the level of fixed drive torque would be chosen so as to provide the appropriate pressure rise within the accumulator in the desired time whilst not driving the motor and pump so hard that excess noise is produced. A fixed torque could be chosen, say at 50% maximum, which would provide a maximum pressure output at the stall condition of the motor. This can be implemented if the motor and pump design were capable of tolerating repeated stalling, to provide automatic switch off of the pumping action at an upper pressure limit.

Figure 11:
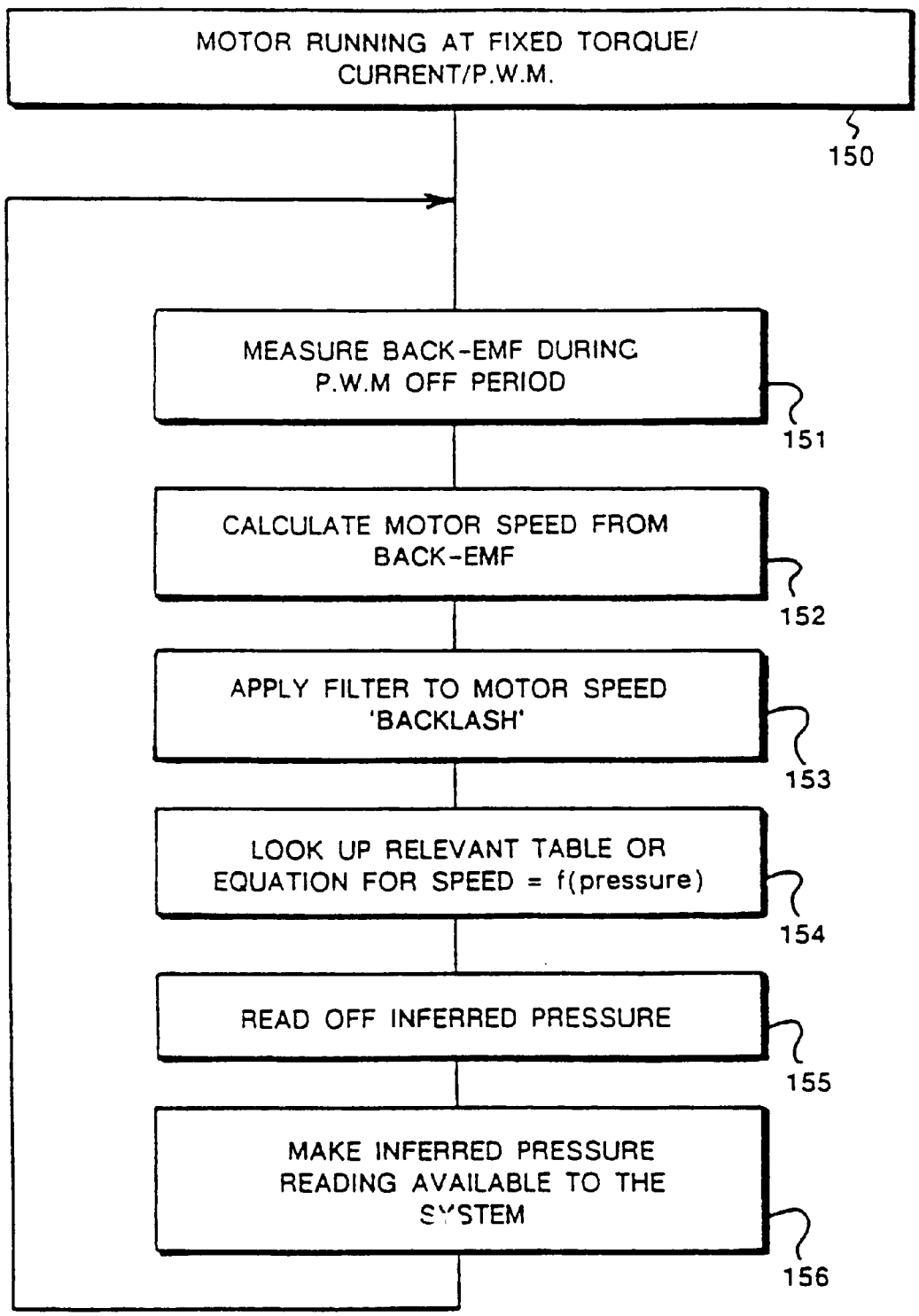
FIG. 11 is a flow diagram illustrating the implementation of fixed torque pressure monitoring.

FIG. 11 represents an implementation of the above described "fixed torque" pressure monitoring. When the motor is set running at a predetermined fixed torque (150) which equates to applying a fixed current or PWM, the back e.m.f. during the PWM off period is measured (151). From this, the actual motor speed can be calculated (152) which will show a cyclical form caused by the pumping action which can be filtered out using an appropriate backlash filter (153). The output from the filter will be a value of mean motor speed at that instant which can be used, with reference to the motor/pump model (154) represented by either a look up table or linear equation where speed is expressed as a function of pressure, to obtain an inferred pressure level (155). This value can then be made available to the control system (156) for corroboration of the pressure sensor signal and/or for control of the motor switch off. The signal can also be used if stored for assessing the condition of the motor/pump system by comparison of performance over time.

Figure 12:
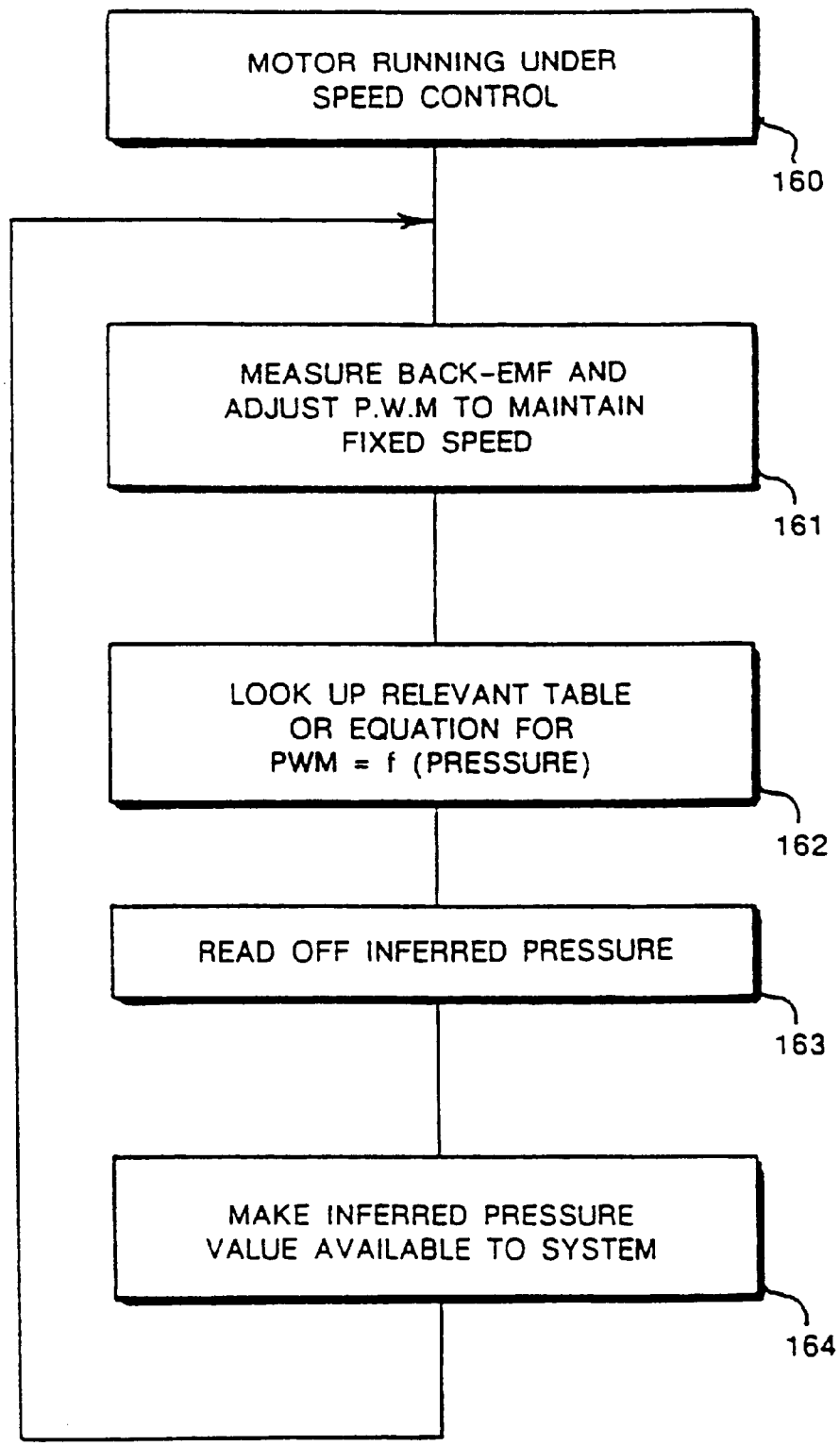
FIG. 12 is a flow diagram illustrating an implementation of fixed speed, torque/current monitoring.

An alternative method of obtaining an inferred pressure level from the motor performance would be to fix the speed at which the motor is run and monitor the torque/current level being supplied. This is obviously the obverse equivalent to the previous method but can offer performance advantages where the motor design and drive control benefited from running at a fixed speed. An implementation of this method is illustrated in FIG. 12. With the motor running at a fixed speed (160), the actual speed is measured through assessing the back e.m.f. generated during the PWM off period and the PWM signal is adjusted to maintain the actual speed at the predetermined fixed level (161). The width of the PWM signal equates to the current and hence to the torque being supplied to or by the motor. This value can be compared with a model represented by either a look up table or equation where the PWM signal is a function of the generated pressure (162). This pressure is read off from the model (163) and is made available to the system for further processing (164).

There are thus provided several methods of inferring the pressure level stored within the accumulator from an assessment of the motor performance. Firstly, one can test the pressure level within the accumulator during the normal motor off phase by periodically attempting to drive the motor at increasing current and hence torque levels. Secondly, there is a choice of at least two methods of inferring the pressure within the accumulator whilst the motor is running by looking at either the speed of the motor at a fixed torque or the torque being delivered by the motor at a fixed speed. The first method can be used to either switch on the pump motor at the lower pressure threshold or be used to corroborate the pressure sensor reading. The second method can be used to turn the motor off at the upper pressure threshold limit or again corroborate the pressure sensor reading.

Furthermore, now having two independently derived signals that measure the same parameter, it is possible to use these signals in determining certain types of fault, i.e. if the motor torque is high for a given measured pressure signal where the pressure sensor is believed to be functioning correctly (valid system start-up test) then a fault indicating that the motor-pump system having excess drag could be detected.

Figure 13:
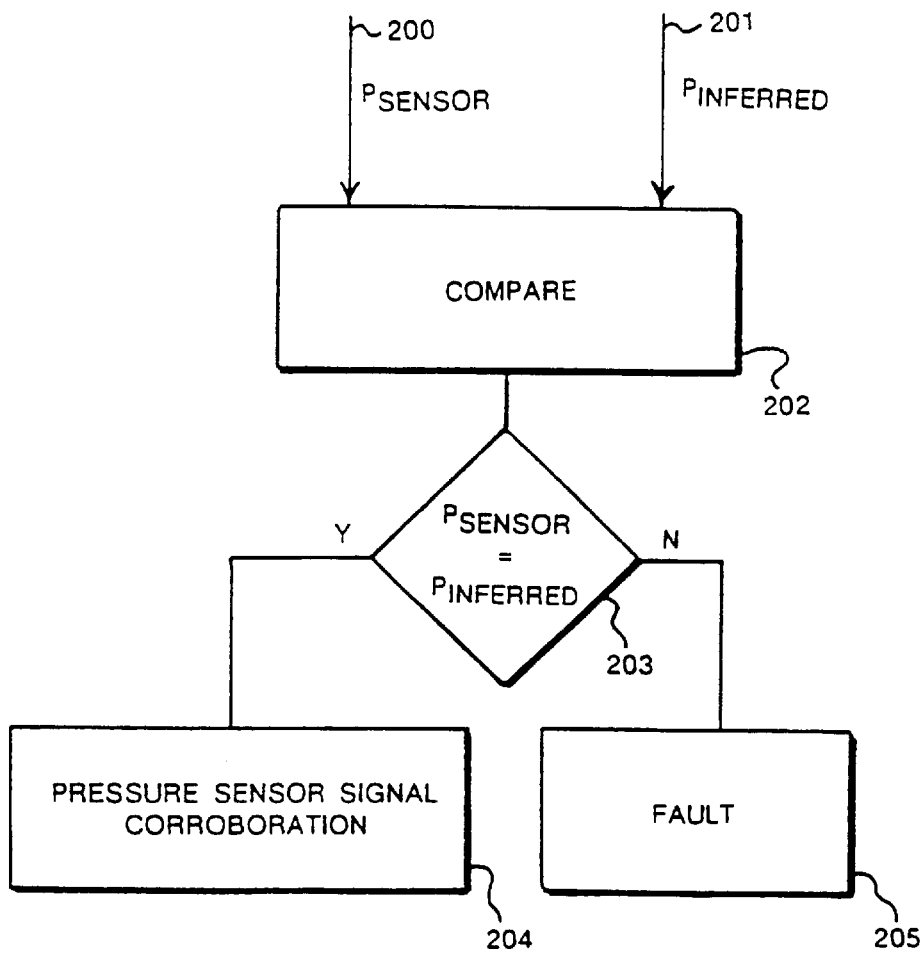
FIG. 13 is a flow diagram illustrating comparison of sensor and inferred signals.

FIG. 13 shows one means by which the comparison of signals can be implemented. The pressure sensor signal (200) and the inferred pressure signal (201) are accepted by the system for comparison. With time, some allowable degradation in the pump, motor and accumulator system can be expected so an allowable drift of the inferred pressure signal can be tolerated. An allowance for this can be made within the comparison (202) which finally compares the two signals for equivalence (203) within limits. Should the signals be equal, then corroboration of the pressure sensor signal (204) as well as integrity of the pump, motor and accumulator are confirmed. should the signals not be equal, then a fault flag (205) is raised. This flag only signifies a discrepancy between the two signals, for without further testing it is not possible at this stage to determine safely which of the two signals is in error. A further test is then necessary to perform a further comparison of the pressure sensor output with another one or more pressure sensors within the system, ie. at one or more of the brakes, or in the backup line (if provided).

Further information about such comparison test can be found in our earlier European Patent No. 0527005 to which reference is directed.

What is claimed is:

1. A vehicle braking system in which a stored volume of a working fluid is used by a brake control system to apply brakes of a vehicle under a control of an electronic control unit, the stored volume being held in an accumulator and being arranged to be replenished by pumping additional working fluid using a pump driven by an electric motor, the vehicle braking system comprising:

a motor controller configured to periodically energize the electric motor for short periods at predetermined intervals when the electric motor is stopped; and a calculator configured to calculate a value representing a pressure in the accumulator based on a motor response including at least one of a motor speed, a motor torque and a motor rotation of the electric motor when the electric motor is energized by the motor controller, the pressure being assessed from the motor response during the short periods, wherein a switch-on point for driving the electric motor for the purpose of recharging the stored volume of the working fluid in the accumulator is arranged to be assessed from a level of motor torque applied during the short periods.

2. A system as claimed in claim 1, including means whereby the torque on the electrical pump motor is arranged to be ramped up to a calculated value which represents a minimum pressure threshold, then held for a short period before being switched off, the resulting motor response being monitored.

3. A system as claimed in claim 1, wherein the calculator is further configured to calculate the value representing the pressure in the accumulator while the electric motor runs based on a motor torque when the electric motor runs at a fixed speed.

4. A system as claimed in claim 1, which includes a pressure sensor which detects the pressure of the working fluid, and wherein a signal for corroborating the signal of the pressure sensor is established from the level of motor torque applied during said short periods of energisation.

5. A system as claimed in claim 1, wherein said motor response is assessed by a means which checks for rotation of the motor for a given applied motor torque.

6. A system as claimed in 1 including means whereby the torque on the electrical pump motor is arranged to be ramped up to a calculated value which represents a minimum pressure threshold, then held for a short period before being switched off, the resulting motor response being monitored.

7. A system as claimed in claim 6, wherein said calculated value of torque is derived from the product of said minimum pressure threshold, the effective area of a piston of the pump and the throw radius of a cam of the pump.

8. A system as claimed in claim 6, wherein, for ramping the pump motor torque up to the calculated value, the current to the motor is increased at a set or prescribed rate up to a value which is calculated to produce the calculated torque.

9. A system as claimed in claim 6, wherein for ramping the pump motor torque up to the calculated value, PWM control of the motor is used wherein the mark-period ratio of the PWM input signal is ramped up from zero to a predetermined value, less than one.

10. A system as claimed in claim 1, wherein the calculator is further configured to calculate the value representing the pressure in the accumulator while the electric motor runs based on a motor speed when the electric motor runs at a fixed torque level.

11. A system as claimed in claim 10, wherein the fixed torque level is chosen to ensure that a maximum pressure output (Pmax) is provided at the stall condition of the motor.

12. A system as claimed in claim 1, further comprising:

a pressure sensor configured to detect the pressure and having a lag in a pressure signal of the pressure sensor, an interval between motor energizations by the motor controller being shortened according to the lag.

13. A system as claimed in claim 1, wherein the torque on the motor is arranged to be ramped up initially with "coarse" increments and then with "fine" increments until the motor runs.

14. A system as claimed in claim 10 wherein, when the motor is operated under the fixed torque condition, the motor speed is assessed from the back e.m.f. during energising PWM off periods, smoothed by way of a "backlash" filter.

15. A system as claimed in claim 14, wherein in the case where the value is to be used for corroboration purposes, the value and a pressure sensor signal are compared for corroboration of the pressure sensor signal.

16. A system as claimed in claim 1, wherein said motor response is assessed by a means which checks for rotation of the motor for a given applied motor torque.

17. A system as claimed in claim 4, wherein said motor response is assessed by a means which checks for rotation of the motor for a given applied motor torque.

* * * * *